(12) United States Patent
Kimsey-Lin et al.

(10) Patent No.: US 9,205,932 B2
(45) Date of Patent: Dec. 8, 2015

(54) METHOD AND SYSTEM FOR DETERMINATION OF PERFORMANCE AND RESPONSE TO ELECTROMAGNETIC RADIATION

(71) Applicant: The Boeing Company, Seal Beach, CA (US)

(72) Inventors: Melanie L. Kimsey-Lin, Shoreline, WA (US); Taylor A. Chaintreuil, Boca Raton, FL (US)

(73) Assignee: THE BOEING COMPANY, Chicago, IL (US)

( * ) Notice: Subject to any disclaimer, the term of this patent is extended or adjusted under 35 U.S.C. 154(b) by 227 days.

(21) Appl. No.: 13/874,638

(22) Filed: May 1, 2013

(65) Prior Publication Data
US 2014/0328073 A1  Nov. 6, 2014

(51) Int. Cl.
*B64D 47/02* (2006.01)
*G01J 3/28* (2006.01)
*B60Q 3/02* (2006.01)
*H05B 37/02* (2006.01)

(52) U.S. Cl.
CPC .............. *B64D 47/02* (2013.01); *B60Q 3/0256* (2013.01); *G01J 3/28* (2013.01); *H05B 37/02* (2013.01)

(58) Field of Classification Search
USPC ............... 356/128, 152.2, 325–326; 250/372, 250/462.1, 463.1, 467.1; 362/23.01, 542, 362/557, 645
See application file for complete search history.

(56) References Cited

U.S. PATENT DOCUMENTS

| | | | |
|---|---|---|---|
| 6,276,634 B1* | 8/2001 | Bodle | 244/118.5 |
| 6,307,207 B1* | 10/2001 | Burbank | 250/462.1 |
| 7,326,435 B2* | 2/2008 | Buckingham et al. | 427/64 |
| 7,369,062 B2* | 5/2008 | Stokes et al. | 340/945 |
| 7,473,003 B2* | 1/2009 | Stokes et al. | 362/84 |
| 7,764,173 B2* | 7/2010 | Yamagiwa | 340/572.1 |
| 8,475,024 B2* | 7/2013 | Stokes | 362/542 |
| 2004/0239243 A1* | 12/2004 | Roberts et al. | 313/512 |
| 2006/0111793 A1* | 5/2006 | Stokes et al. | 700/3 |
| 2008/0084539 A1* | 4/2008 | Daniel | 351/210 |
| 2008/0239451 A1* | 10/2008 | Mitchell et al. | 359/265 |
| 2010/0148083 A1* | 6/2010 | Brown et al. | 250/372 |
| 2012/0091607 A1 | 4/2012 | Sutter | |
| 2013/0027901 A1* | 1/2013 | Martin et al. | 362/23.01 |

OTHER PUBLICATIONS

European Patent Office; Extended European Search Report for EP14158277.5 dated Sep. 22, 2014.

* cited by examiner

*Primary Examiner* — Sang Nguyen
(74) *Attorney, Agent, or Firm* — Parsons Behle & Latimer

(57) ABSTRACT

A method of selecting a lighting pattern of an aircraft is disclosed herein. The method comprises exposing a photoluminescent element to electromagnetic radiation emitted from a light source of the aircraft. The light source has (a) a spectral power distribution and (b) an illumination level. The method also comprises calculating a total energy absorbed by the photoluminescent element based on (a) the spectral power distribution, (b) the illumination level, and (c) an exposure duration. The method comprises correlating the total energy absorbed to a discharge duration based on a normalized photoluminescent response function of the photoluminescent element. And the method also comprises verifying that the (a) spectral power distribution, (b) illumination level, and (c) exposure duration of the light source are in compliance with operational guidelines for the light source and the photoluminescent element based on the discharge duration.

14 Claims, 8 Drawing Sheets

METHOD AND SYSTEM FOR DETERMINATION OF PERFORMANCE AND RESPONSE TO ELECTROMAGNETIC RADIATION

BACKGROUND

The present application relates generally to the field of electromagnetic radiation and more specifically to determining performance characteristics for materials in response to exposure to emitted electromagnetic radiation.

Electromagnetic radiation (EMR) is a form of energy having both electric and magnetic components. EMR may be emitted from an EMR source and absorbed and/or reflected by an EMR-sensitive material.

One category of EMR-sensitive materials includes photoluminescent materials. Photoluminescent materials may absorb energy, or photons, from EMR, store that energy, and release energy in the form of visible light, among other things. For instance, materials colloquially referred to as "glow in the dark" materials may comprise photoluminescent materials.

Another category of EMR-sensitive materials includes photovoltaic materials. Like photoluminescent materials, photovoltaic materials may absorb energy from EMR. Photovoltaic materials may be configured to facilitate the conversion of absorbed energy from EMR into electricity. For instance, one common use of photovoltaic materials is solar arrays and panels.

Yet another category of EMR-sensitive materials includes materials sensitive to EMR outside of the visible light spectrum or otherwise having a low illumination level and configured to facilitate the conversion of sensed EMR into visible light and/or otherwise enhance the sensed EMR. These EMR-sensitive materials may be present in enhanced vision devices, such as night vision goggles and binoculars, among other things.

EMR-sensitive materials may not operate optimally outside of certain wavelength ranges, thus it may be advantageous to verify that a given EMR-sensitive material will operate as desired within a predetermined area of a structure or vehicle. For instance, it may be necessary to test an EMR-sensitive material, such as photoluminescent materials in an aircraft, to verify adherence to operational guidelines. Testing the EMR-sensitive material may comprise performing multiple tests in a plurality of situations and orientations and may result in significant time and monetary expenditures. This testing and retesting may comprise exposing EMR-sensitive materials to given EMR during a predetermined duration of time, and then measuring the amount of time during which the EMR-sensitive materials operate within acceptable thresholds. For example, as new lighting systems are installed in an aircraft, it may be necessary to retest the photoluminescent materials to verify compliance with minimum required standards. Additionally, it may be necessary to let the EMR-sensitive materials return to initial levels prior to testing differing scenarios.

SUMMARY

A method of selecting a lighting pattern of an aircraft is disclosed herein. In this method, the aircraft has a light source and a photoluminescent element. The method comprises exposing the photoluminescent element to electromagnetic radiation emitted from the light source of the aircraft. The light source has (a) a spectral power distribution and (b) an illumination level. The method also comprises calculating a total energy absorbed by the photoluminescent element based on (a) the spectral power distribution, (b) the illumination level, and (c) an exposure duration. The method comprises correlating the total energy absorbed to a discharge duration based on a normalized photoluminescent response function of the photoluminescent element. The method also comprises verifying that the (a) spectral power distribution, (b) illumination level, and (c) exposure duration of the light source are in compliance with operational guidelines for the light source and the photoluminescent element based on the discharge duration. And the method also comprises selecting the lighting pattern based on the (a) spectral power distribution, (b) illumination level, (c) exposure duration of the light source, or discharge duration of the photoluminescent element.

An aircraft is also disclosed herein. The aircraft has a lighting system, a photoluminescent element comprising a photoluminescent material, one or more sensors, and a calculation module. The lighting system is configured to emit EMR, and has a spectral power distribution and an illumination level. The photoluminescent material is configured to absorb photons from the EMR emitted by the lighting system, and the photoluminescent material has a normalized photoluminescent response function and configured to emit photons. The one or more sensors are configured to measure the spectral power distribution and illumination level of the lighting system. The photoluminescent material is configured such that when it is exposed to EMR, the photoluminescent material has a total energy absorbed related to exposure to EMR. The calculation module is configured to calculate a discharge duration of the photoluminescent material based on the spectral power distribution and the illumination level of the lighting system and the normalized photoluminescent response function of the photoluminescent material.

A system for determining performance characteristics of a material based on exposure to EMR from an EMR source is also disclosed herein. The system comprises a sensor, a correlation module, and a calculation module. The sensor is configured to measure (a) a spectral power distribution, (b) an illumination level, and (c) exposure duration of an EMR source. The correlation module is configured to correlate (a) the spectral power distribution, (b) the illumination level, and (c) the exposure duration to a total energy absorbed by the material. And the calculation module is configured to calculate one of (i) a discharge duration related to a normalized response function of the material, or (ii) an energy generation value related to a response function of the material, or (iii) a total effective energy value related to a response function of the material.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific examples in which the disclosure may be practiced. These examples are described in sufficient detail to enable those skilled in the art to practice the disclosure, and it is to be understood that other examples may be utilized and that various changes may be made without departing from the spirit and scope of the present disclosure. The following detailed description is, therefore, not to be taken in a limiting sense.

Figure 1:
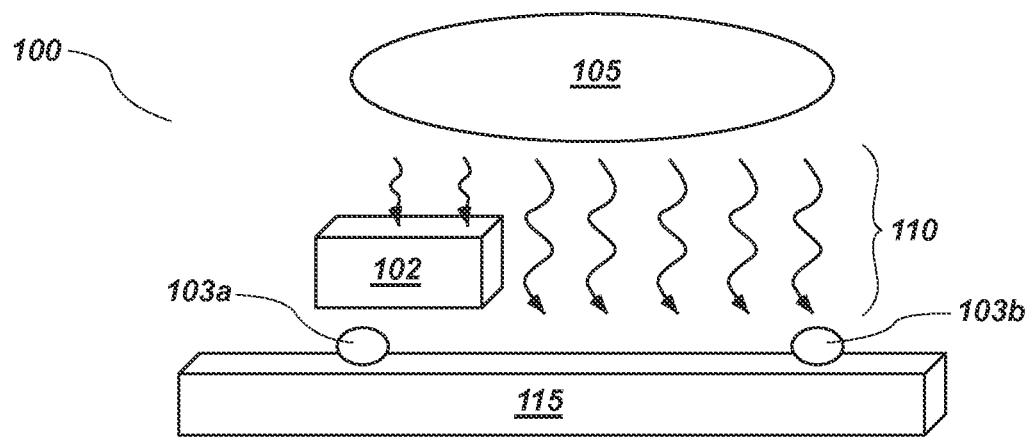
FIG. 1 shows a system for measurement of a performance characteristic of an element.

FIG. 1 illustrates a system 100 for measurement of a performance characteristic comprising an electromagnetic radiation source ("EMR source") 105, the EMR source 105 emitting electromagnetic radiation ("EMR") 110, and an electromagnetic radiation-sensitive element ("EMR-sensitive element") 115. The system 100 may further comprise a structure 102 and a plurality of sensors 103a and 103b. Additionally, the plurality of sensors 103a and 103b may be connected to other modules and/or devices (not shown) configured to, among other things, correlate data, calculate data, and display data. As illustrated in FIG. 1, the emitted EMR 110 may be incident upon structure 102 and EMR-sensitive element 115. The system 100 for measurement of a performance characteristic may comprise any other elements necessary to detect, sense, and/or measure EMR 110 as emitted by EMR source 105, EMR 110 incident on and/or reflected by EMR-sensitive element 115, such as sensors 103a and 103b. Further, system 100 may be configured to detect, sense, and/or measure any EMR 110 emitted by EMR-sensitive element 115 (not shown).

EMR source 105 may comprise any suitable source of EMR 110 within the electromagnetic radiation spectrum. For instance, EMR source 105 may be configured to emit EMR 110 within any of the gamma ray (EMR 110 having a wavelength of less than approximately 1E-11 m), X ray (EMR 110 having a wavelength between approximately 1E-11 and approximately 1E-8 m), UV (EMR 110 having a wavelength between approximately 1E-8 m and approximately 400 nm), visible (EMR 110 having a wavelength between approximately 400 nm and approximately 700 nm), infrared (EMR 110 having a wavelength between approximately 700 nm and approximately 1E-3 m), microwave (EMR 110 having a wavelength between approximately 1E-3 and approximately 1 m), and radio wave (EMR 110 having a wavelength greater than approximately 1 m) spectrums, among other things. In one example, EMR source 105 may be configured to emit visible light. In this example, EMR source 105 may comprise a natural light source, such as astronomical objects like the sun, moon, and stars or other atmospheric sources of light, among other things. EMR source 105 may also comprise chemical- or electric-powered sources of visible light. For instance, EMR source 105 may comprise electron stimulated, incandescent, electroluminescent, gas discharge, and/or high-intensity discharge sources of visible light, among other things. In one example, EMR source 105 may comprise an LED light source.

EMR-sensitive element 115 may comprise any suitable EMR-sensitive element. For instance, in one example, EMR-sensitive element 115 may comprise a photovoltaic element configured to convert electromagnetic radiation 110 into electricity. For example, EMR-sensitive element 115 may comprise a solar cell array configured to convert EMR 110 from the sun into electricity. Suitable materials for the photovoltaic element may comprise monocrystalline silicon, polycrystalline silicon, amorphous silicon, cadmium telluride, and copper indium gallium selenide/sulfide, among other things.

Alternatively, EMR-sensitive element 115 may comprise a photoluminescent element configured to absorb and/or emit EMR 110. For instance, EMR-sensitive element 115 may comprise a photoluminescent strip. Suitable materials for the photoluminescent element may comprise strontium aluminate, copper-activated zinc sulfide, fluorescent materials, or any other material configured to emit EMR 110 in response to absorbed EMR 110.

Alternatively, EMR-sensitive element 115 may comprise a material configured to absorb EMR 110 outside of the visible light spectrum and/or having low illumination levels. For example, an enhanced vision device may comprise an EMR-sensitive element 115 configured to amplify absorbed EMR 110. For example, EMR-sensitive element 115 may be utilized in a night vision goggles embodiment, and the EMR-sensitive element 115 may be configured to absorb low levels of EMR 110 and amplify the energy to aid in navigation, among other things. Suitable technologies for enhanced vision devices include infrared radiation detector and photocathode, among other things.

In operation, EMR 110 may be emitted from EMR source 105 and may be incident upon EMR-sensitive element 115. EMR-sensitive element 115 may react to incident EMR 110. For instance, EMR-sensitive element 115 may absorb photons from EMR 110 and may convert the absorbed photons into electricity. In this example, EMR-sensitive element 115 may comprise a solar cell configured to convert exposure to EMR 110 from an EMR source 105, in this case the sun, into electricity. In another example, EMR-sensitive element 115 may emit photons in response to incident EMR 110. In this example, EMR-sensitive element 115 may comprise a photoluminescent element that may emit photons in response to incident EMR 110, which may comprise visible light in a given spectrum, among other things. In yet another example, EMR-sensitive element 115 may amplify received photons in response to incident EMR 110. In one example, an enhanced vision device may comprise an EMR-sensitive element 115 that may amplify photons in response to incident EMR 110, among other things. In another example, EMR-sensitive element 115 may absorb, sense, and/or detect incident EMR 110 outside of the visible light spectrum and the EMR-sensitive element 115 may facilitate a translation or conversion of the incident EMR 110 into the visible light spectrum for detection by a user.

Structure 102 may comprise any structure that may impede the propagation of EMR 110 from EMR source 105 and onto EMR-sensitive element 115. For instance, in an aircraft example, structure 102 may comprise an overhead compartment, a seat, a door, a wall partition, or another portion of the airframe of the aircraft, or anything else that could impede the propagation of EMR 110. In a building or structure environment, structure 102 may comprise a door, a wall, or a desk, among other things. As illustrated in FIG. 1, structure 102 may be arranged relative to EMR source 105 and EMR-sensitive element 115 to impede at least a portion of EMR 110 from reaching EMR-sensitive element 115. Thus, in one example, a portion or region of EMR-sensitive element 115 may not absorb EMR 110. In this example, it may be advantageous to detect whether EMR-sensitive element 115 absorbs EMR 110 at a given location of EMR-sensitive element 115.

Sensors 103a and 103b may comprise any devices configured to detect illumination level and spectral power distribution. For instance, sensors 103a and 103b may comprise CMOS sensors, CCD sensors, particle detectors, photodiodes, or photoresistors, among other things. Sensors 103a and 103b may be configured to detect EMR 110 emitted from EMR source 105. System 100 may comprise any number of sensors arranged within the system 100 in order to detect EMR 110. For instance, sensor 103a may be arranged in proximity to structure 102 in order to detect the levels of EMR 110 that reaches EMR-sensitive element 115 at an obstructed portion of EMR-sensitive element 115. For example, in an aircraft scenario, it may be advantageous to verify that an obstructed portion of an EMR-sensitive element 115 operates within desired thresholds.

Sensors 103a and 103b may be connected to a module or device (not shown) configured to correlate, calculate, or display data acquired by sensors 103a and 103b. In one example, sensors 103a and 103b may be combined in the same device as a correlation module, a calculation module, and/or a display module.

As was explained above, verification that an EMR-sensitive element 115 complies with operational requirements may be performed by exposing EMR-sensitive element 115 to EMR 110 for a predetermined amount of time and then measuring an amount of time during which the EMR-sensitive element 115 operates within desired ranges of compliance. However, in this example, an obstructed portion of EMR-sensitive element 115 may be arranged behind a structure 102 and sensor 103a may be positioned relative to EMR-sensitive element 115 and structure 102 in order to test the levels of EMR 110 that propagate to the obstructed portion of EMR-sensitive element 115. Next, a response function of the given EMR-sensitive element 115, such as a normalized photoluminescent response function for a photoluminescent element, may be used in conjunction with the data collected by sensor 103a to determine the compliance of EMR-sensitive element 115 without the time and expense of charging and discharging EMR-sensitive element 115 and physically measuring or sensing its discharge characteristics. The resulting data may then be used in order to alter, for instance, the placement of EMR-sensitive element 115, the operating wavelength and/or frequencies of EMR source 105, and the placement of structure 102, among other things. The resulting data may also be used to create operational guidelines for the system 100.

Figure 2A:
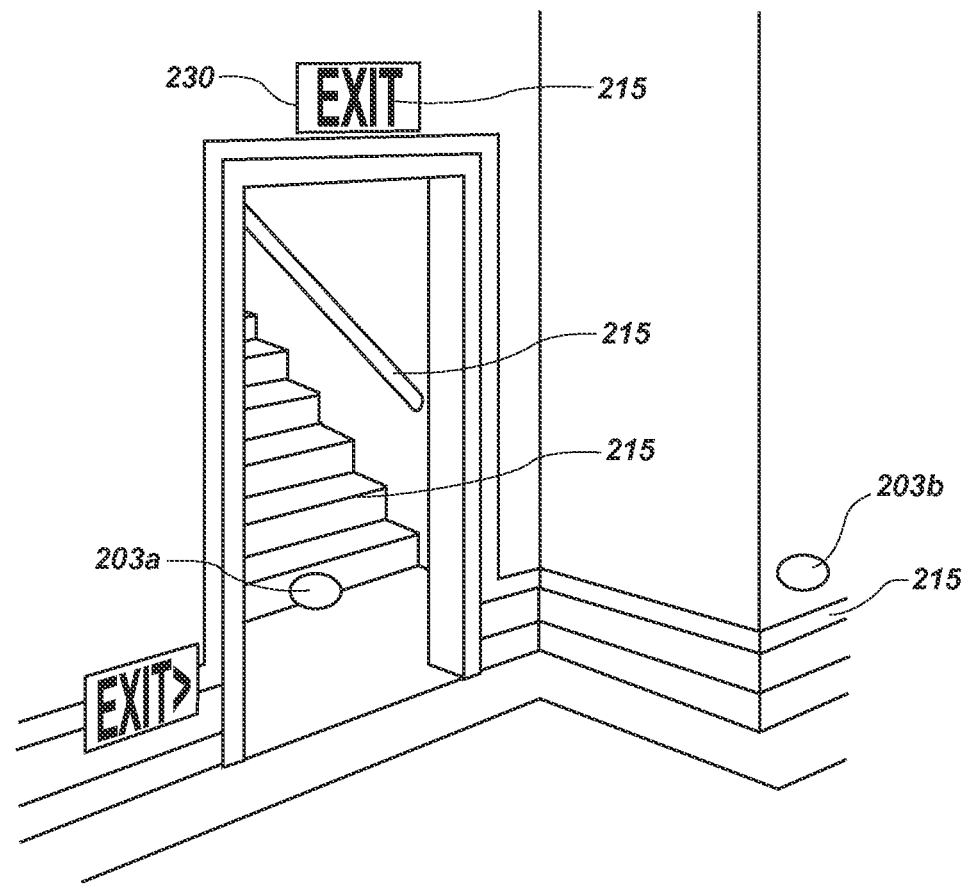
FIGS. 2A-2B illustrate different examples for which a performance characteristic of an element may be measured.
Figure 2B:
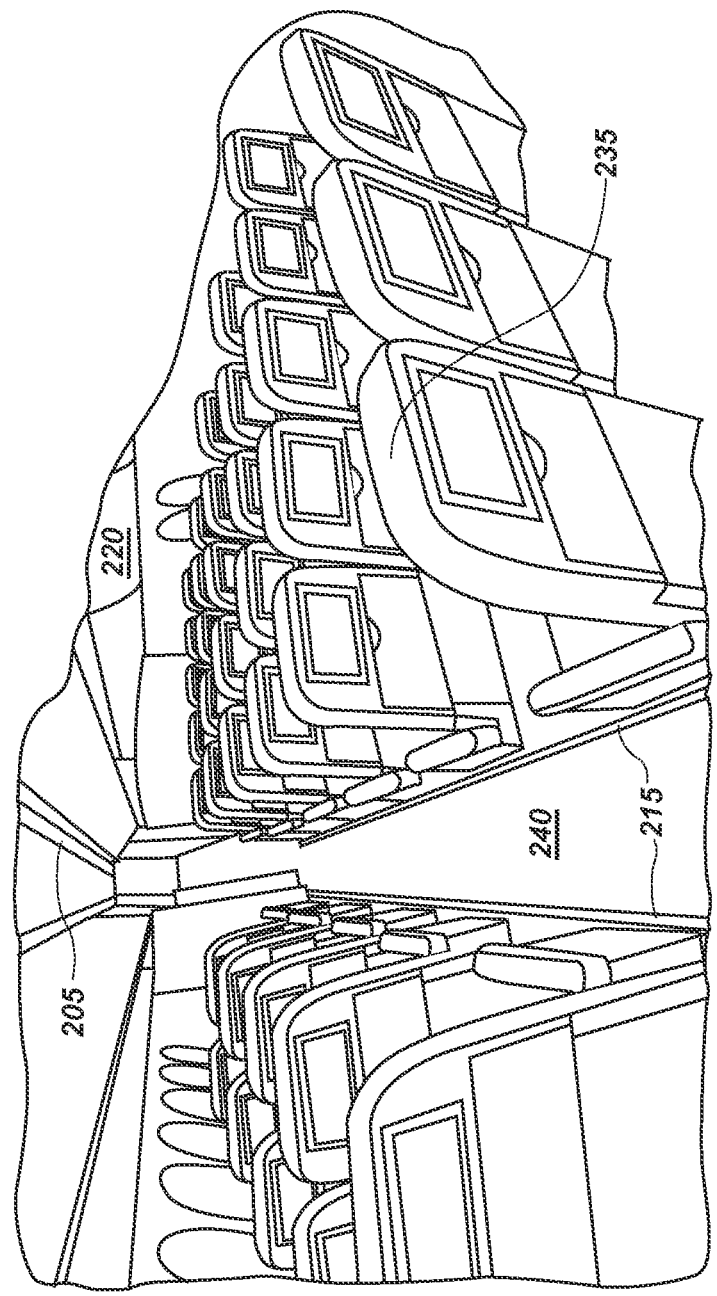

FIGS. 2A-2B illustrate different examples of EMR-sensitive elements 215. For instance, FIG. 2A illustrates an indicator 230, in this case, an exit sign, comprising an EMR-sensitive element 215. Indicators, such as indicator 230, may comprise EMR-sensitive element 215 in order to, for instance, indicate or transmit information. In this example, indicator 230 may indicate the direction of an exit. EMR-sensitive element 215 of indicator 230 may be configured to transmit photons or otherwise emit EMR, such as EMR 110 illustrated in FIG. 1, even in the absence of an electric source. EMR-sensitive element 215 may comprise a photoluminescent element configured to emit EMR 110. In this example, EMR-sensitive element 215 may be further configured to emit EMR 110 even in the absence of an EMR source, such as EMR source 105.

In one exemplary use, indicator 230 may comprise an exit sign directing users to the exits out of a structure or a vehicle, such as a building, a stairwell, an aircraft, or a ship, among other things. During normal operation, indicator 230 and EMR-sensitive element 215 may be exposed to and receive EMR, such as EMR 110 illustrated in FIG. 1, such as from light entering through a window or from any other suitable EMR source 105, such as a light bulb, among other things. However, in the absence of an active EMR source 105, such as at night, or when all EMR sources 105 are inactive, EMR-sensitive element 215 may emit EMR 110 comprising visible light in order to continue indicating the exit. Of course, this is but one example of the multitude of possible uses, methods, and systems contemplated by the present disclosure.

FIG. 2A also illustrates a doorway revealing a stairwell. The doorway may be indicated by indicator 230 and EMR-sensitive elements 215. In one example, EMR-sensitive elements 215 may comprise photoluminescent elements, such as photoluminescent paint or tape, among other things. For instance, indicator 230 may comprise EMR-sensitive element 215, and the doorway may be outlined with EMR-sensitive element 215. Furthermore, the steps and the rail in the stairwell may also comprise EMR-sensitive element 215. Indicators 230 and EMR-sensitive elements 215 may be exposed to EMR 110. However, it may be desirable to analyze the compliance of EMR-sensitive elements 215 with predetermined characteristics and thresholds. As was discussed above, the compliance of EMR-sensitive elements 215 may be verified by exposing EMR-sensitive elements 215 to EMR for a predetermined period of time and at a predetermined spectral power distribution, and thereafter measuring the time during which the EMR-sensitive elements 215 operate within predetermined or desired operational thresholds. Alternatively, a sensor or a plurality of sensors, such as sensors 203a and 203b, may be arranged at a variety of locations to measure and/or sense EMR, such as EMR 110, that may propagate in the structure. For instance, a sensor 203a may be placed in a given location of a stairwell in order to detect an illumination level and a spectral power density of EMR absorbed by EMR-sensitive element 215. Data collected by sensor 203a may be correlated with a response function of EMR-sensitive element 215, such the normalized response function of a photoluminescent device, in order to calculate operational characteristics of EMR-sensitive element 215.

In operation, indicators 230 and EMR-sensitive elements 215 may be used, in a structure or vehicle, among other things, such as a building or an aircraft. In one example, indicators 230 and EMR-sensitive elements 215 comprising, for example, photoluminescent elements, may be used in a building and may be exposed to EMR 110 from a plurality of EMR sources 105, such as from light bulbs and natural light. After exposure to EMR sources 105, indicators 230 and EMR-sensitive elements 215 may be configured to emit EMR 110 in the absence of EMR sources 105, such as when the lights are off or the sun is not shining. For instance, a building or a vehicle comprising EMR-sensitive elements 215 may be operating in a low power mode or may be experiencing an emergency, and indicators 230 and EMR-sensitive elements 215 may nevertheless be configured to provide or otherwise indicate information, such as the location of an exit.

FIG. 2B illustrates another use of EMR-sensitive elements 215 according to the present disclosure. FIG. 2B illustrates an aircraft interior 220 comprising a plurality of seats 235 and an aisle 240, which may impede the propagation of EMR much in the same way that structure 102 impedes the propagation of EMR 110 in FIG. 1. As illustrated, aisle 240 may be bordered by EMR-sensitive elements 215. Aircraft interior 220 also comprises an EMR source 205, in this example, a source configured to provide visible light. EMR-sensitive elements 215 may be configured to be exposed to EMR 110 emitted from EMR source 205.

EMR source 205 may comprise any suitable source of EMR 110. One or more EMR sources 205 may be combined to form a lighting system of aircraft interior 220. In the example illustrated by FIG. 2B, EMR source 205 may comprise any combination of LED, fluorescent and incandescent light sources, such as LED-based, fluorescent or incandescent lighting elements. Further, EMR source 205 may be configured to provide EMR from predetermined spectrums and may also be configured to alter the emitted EMR 110 as desired. For example, EMR source 205 may comprise a plurality of LED lighting elements configured to provide different light along the electromagnetic radiation spectrum, such as blue, green, and red light, among other things.

Additionally, EMR source 205 may be configured to change or otherwise alter the EMR 110 it emits. For example, EMR source 205 may be configured to emit visible light of a given spectrum (e.g., blue light) at a first time, from a second spectrum (e.g., green light) at a second time, and from a third spectrum (e.g., yellow light) at a third time. Thus, EMR-sensitive elements 215 may be exposed to emitted EMR 110 from a plurality of differing spectrums.

In an additional example, EMR source 205 may be programmed to emit EMR 105 according to a predetermined pattern. For instance, in one example, EMR source 205 may be programmed with a takeoff pattern, wherein EMR 110 may be emitted within a predetermined electromagnetic spectrum during takeoff of the aircraft. EMR source 205 may be programmed with a nighttime pattern wherein EMR 110 may be emitted within a predetermined electromagnetic spectrum during the nighttime. Any number of patterns and arrangements may be set up in order to emit EMR and/or illuminate the aircraft interior 220 according to the present disclosure.

In one example, EMR-sensitive element 215 may comprise light filters configured to alter the color of EMR 110 emitted by EMR-sensitive element 215. In one example, light filters may comprise a film applied to an EMR-sensitive element 215. Alternatively, filters may comprise a polycarbonate tinting. For instance, a light filter may be applied to EMR-sensitive element 215 in order to achieve emission of EMR 110 of a predetermined color of visible light. In one example, the light filter may reduce the luminance or illumination level of EMR-sensitive element 215.

The reduction in luminance or illumination level of EMR-sensitive element 215 due to the light filter may be related to a degradation factor of the light filter. Additionally, the degradation factor may also relate to the sensitivity or absorption of EMR 110 by EMR-sensitive element 215. The degradation factor of a light filter may also be related to the discharge duration of an EMR-sensitive element 215. In one example, the degradation factor of a light filter may enable calculation of the discharge duration of an EMR-sensitive element 215. For instance, the degradation factor of a light filter may be an additional variable to consider in determining the discharge duration of an EMR-sensitive element 215.

Any number of data may be determined by measuring certain characteristics of an EMR source 205, an EMR-sensitive element 215, and an EMR 110, among other things. For instance, after exposure to EMR 110, an EMR-sensitive element 215 may emit EMR 110 at a given luminance or illumination level for a given time period. As used herein, luminance or illumination level are a measure of the luminous intensity of EMR 110 travelling in a given direction and in a given unit of area. In another example, EMR source 205 and/or EMR-sensitive element 215 may have a spectral power distribution, which, as used herein, is a measurement of power per unit area per unit of wavelength of EMR 110.

EMR-sensitive element 215 may have a response function, such as a normalized photoluminescent response function for a photoluminescent element, that may describe the properties of the EMR-sensitive element 215. For example, the normalized photoluminescent response function of a given EMR-sensitive element 215 may indicate the ability of the EMR-sensitive element 215 to absorb specific wavelengths. EMR-sensitive element 215 may also have a total energy absorbed, which may indicate the total amount of energy or photons absorbed by EMR-sensitive element 215. The total energy absorbed for a given EMR-sensitive element may be related to the normalized response function for the EMR-sensitive element. EMR-sensitive element 215 may have a response function that may be related to the total energy absorbed for a given EMR-sensitive element.

EMR-sensitive elements 215 may further exhibit a plurality of performance characteristics. For instance, EMR-sensitive elements 215 may have a sensitivity to EMR, such as EMR 110 illustrated in FIG. 1, that may comprise a function of the normalized response function of the EMR-sensitive element 215, and that may contribute to, among other things, energy or photon absorption and emission characteristics. For instance, an EMR-sensitive element 215 may have a given performance characteristic and may therefore be sensitive to a certain spectrum of EMR 110. In one example, EMR-sensitive element 215 may have a performance characteristic such that EMR-sensitive element 215 may absorb blue light (EMR 110 having a wavelength range from approximately 450 nm to approximately 495 nm) but not red light (EMR 110 having a wavelength range from approximately 620 nm to approximately 750 nm). In another example, EMR-sensitive element 215 may have a performance characteristic such that EMR-sensitive element 215 reacts to UV light, but not infrared light.

The possible performance characteristics of an EMR-sensitive element 215 may comprise any number of discharge characteristics. For instance, EMR-sensitive element 215 may have a measurable discharge duration defined as the total time required for the EMR-sensitive element 215 to reach a predetermined minimum acceptable luminance value from an initial starting point. The discharge duration for a given EMR-sensitive element 215 may comprise a function of the spectral power distribution of the EMR source 205 to which the EMR-sensitive element 215 is exposed. The discharge duration may also be a function of an illumination level, or the luminance, of a given EMR source 205 to which the EMR-sensitive element 215 is exposed. The discharge duration may also be a function of the exposure duration, relating to the total amount of time during which a given EMR-sensitive element 215 is exposed to EMR 110. In another example, it may be possible to calculate an expected discharge duration for a given EMR source 205 related to a total energy absorbed by a given EMR-sensitive element 215. Thus, in this example, it may be possible to calculate a discharge duration for the given EMR-sensitive element 215 given the EMR source 205 at a variety of locations within aircraft interior 220, rather than expending time and money performing and measuring absorption and discharge times of the EMR-sensitive element 215.

In use, EMR 110 emitted from EMR source 205 may propagate throughout aircraft interior 220. In one example, the propagation of EMR, such as EMR 110 illustrated in FIG. 1, may be influenced and/or affected by the placement of structures or elements within aircraft interior 220, such as a seat 235, an overhead compartment, or a wall structure, among other things. EMR-sensitive element 215 may have a sensitivity to EMR 110 within a given electromagnetic spectrum. For instance, EMR-sensitive element 215 may have a sensitivity to blue visible light, but EMR-sensitive element 215 may not have a sensitivity to other spectrums of visible light, infrared light, and UV light among other things. In this example, it may be possible to calculate a total energy absorbed by EMR-sensitive element 215 based on, for instance, a spectral power distribution of an EMR source 205, an illumination level of EMR source 205, and an exposure duration of an EMR source 205 to the EMR-sensitive element 215. In one embodiment, an estimated discharge duration may be calculated related to the total energy absorbed by the EMR-sensitive element 215 and/or the normalized photoluminescent response function or response function of the EMR-sensitive element 215, among other things. Of course, the preceding examples are offered for illustrative purposes, and one of ordinary skill in the art would recognize that the present disclosure contemplates additional examples, systems, devices, and methods, among other things.

Figure 3:
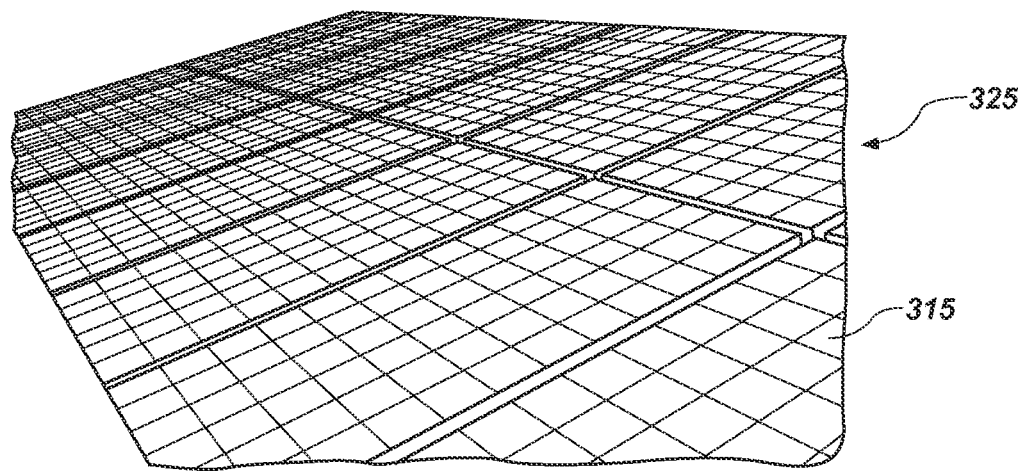
FIG. 3 illustrates a photovoltaic array.

FIG. 3 illustrates an EMR-sensitive element 315 arranged within a photovoltaic array 325. EMR-sensitive element 315 may be configured to receive EMR, such as EMR 110 illustrated in FIG. 1, emitted from an EMR source, such as EMR source 105, in this case, the sun. Photovoltaic array 325 may be configured to convert absorbed photons from EMR 110 into electricity. Analogous to the examples described above, EMR source 105 may have a spectral power distribution and an illumination level. EMR-sensitive element 315 may be configured to absorb photons, or energy, from EMR source 105, and it may be possible to determine a total energy absorbed by EMR-sensitive element 315 as a function of the spectral power distribution and illumination level of EMR source 105. In one example, EMR-sensitive element 315 may have a response function representing a response of EMR-sensitive element 315 to different wavelengths and illumination levels of EMR 110. For instance, in one example, EMR-sensitive element 315 may have a response function indicating a heightened sensitivity along a given range of wavelengths, and it may be possible to determine, based on the response function, an expected energy generation value based on location and orientation, among other things.

In use, a spectral power distribution and an illumination level of an EMR source 105 may be measured and/or sensed. The spectral power distribution and/or the illumination level may be relied upon to calculate a total energy absorbed by EMR-sensitive element 315. The total energy absorbed may be related to the response function of EMR-sensitive element 315. The total energy absorbed may also be related to the exposure duration, signifying the amount of time elapsing between a first point in time to a second point in time during which EMR-sensitive element 315 is exposed to EMR 110. In one example, total energy absorbed may be calculated according to a base unit of time, such as, for example, during a minute. An expected energy generation value may be calculated based on, for instance, the calculated total energy absorbed and the response function. Thus, it may be possible to determine and/or predict performance of a photovoltaic array 325 comprising en EMR-sensitive element 315 without expending the time and money to actually place the photovoltaic array 325 and test its performance characteristics. The calculated expected energy generation value may also be utilized to select an optimal photovoltaic array 325, an optimal placement of photovoltaic array 325, and operational guidelines for the photovoltaic array 325 and EMR-sensitive element 315, among other things.

Figure 4:
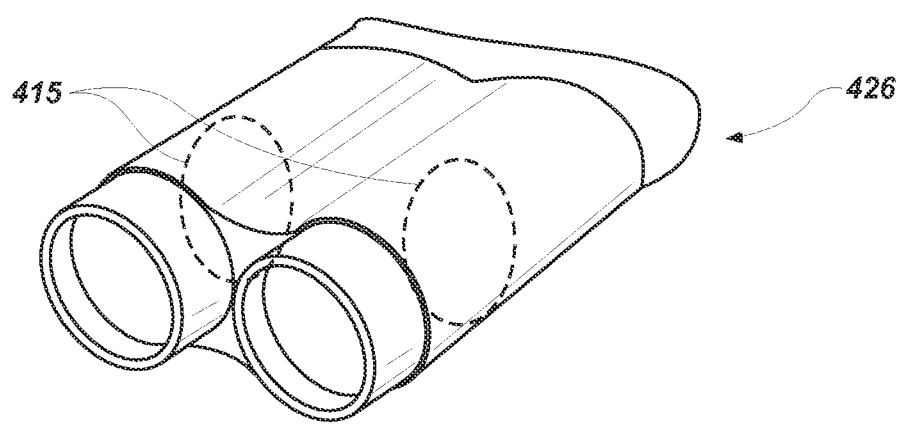
FIG. 4 illustrates an enhanced vision device.

FIG. 4 illustrates an enhanced vision device 426 comprising an EMR-sensitive element 415. Analogous to the discussion in FIGS. 1-3, EMR-sensitive element 415 may be configured to receive EMR. In one example, the EMR may comprise a low illumination level and may not be readily detectable by the human eye, or may comprise wavelengths outside of the visible light spectrum. In one example, enhanced vision device 426 may be configured to amplify absorbed photons. In another example, enhanced vision device 426 may be configured to translate or convert EMR 110 into wavelengths along the visible light spectrum to facilitate identification for a user.

In one example, it may be possible to determine a total energy absorbed by EMR-sensitive element 415 as a function of the spectral power distribution and illumination level of EMR source 105. Furthermore, EMR-sensitive element 415 may have a response function representing a response of EMR-sensitive element 415 to different wavelengths and illumination levels of EMR 110. For instance, in one example, EMR-sensitive element 415 may have a response function indicating a heightened sensitivity along a given range of wavelengths, and it may be possible to determine, based on the response function, a total effective energy value based on the wavelengths, spectral power distribution, and illumination level of EMR source 105, among other things.

As used herein, the total effective energy value refers to an evaluation of the effectiveness of EMR-sensitive element 415 in a given environment and along a given spectrum of wavelengths. For instance, in one example, an enhanced vision device 426 may comprise an EMR-sensitive element 415 configured to have a sensitivity along a first spectrum of wavelengths, and the sensitivity may be detected or calculated based on the response function of the EMR-sensitive element 415. Being able to calculate a total effective energy of an EMR-sensitive element 415 may advantageously facilitate the selection of EMR-sensitive element 415 for a given use and in a given environment. The calculation of a total effective energy may also facilitate the creation of operation guidelines for an EMR-sensitive element 415 and/or an enhanced vision device 426.

Figure 5A:
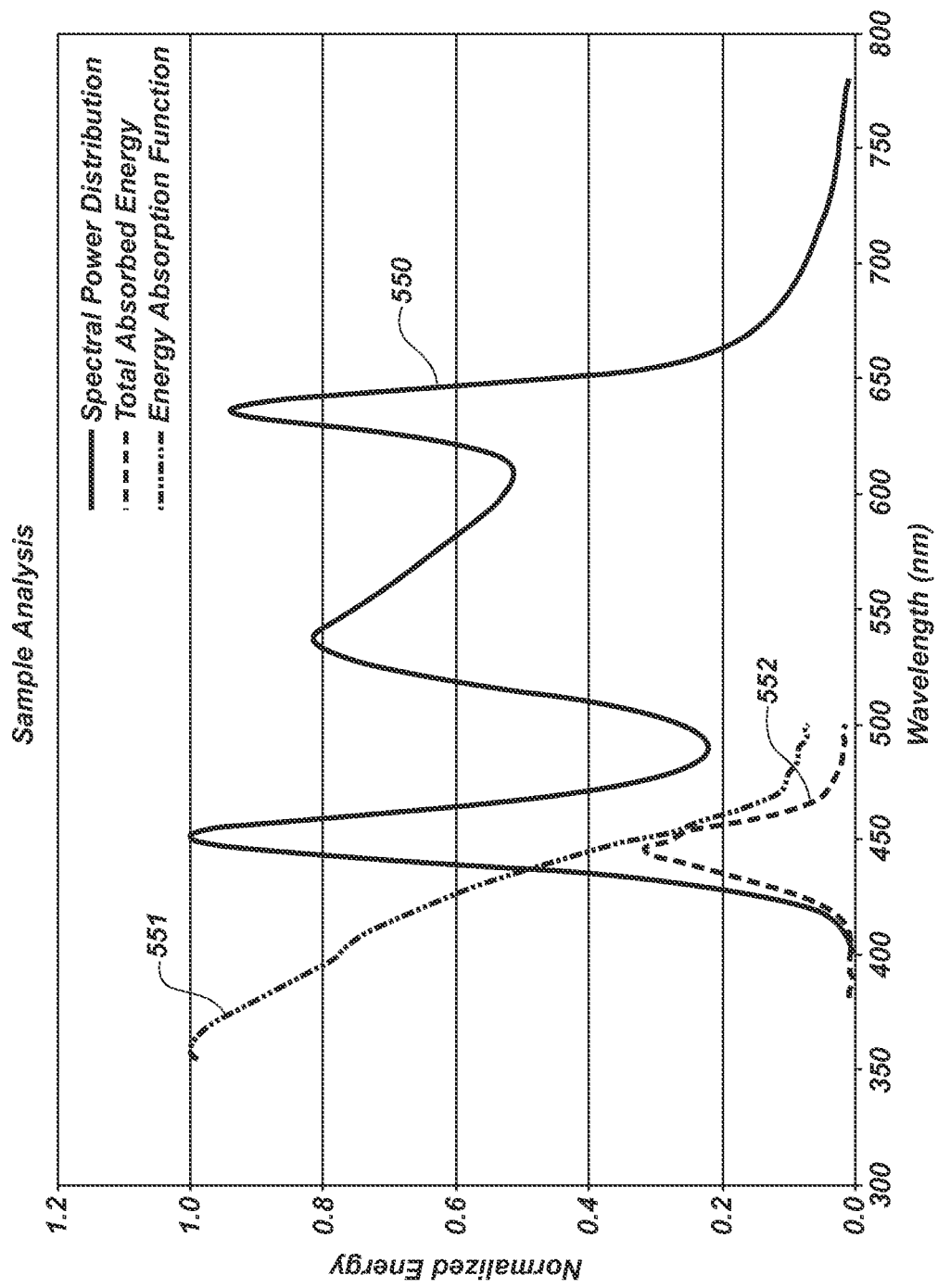
FIGS. 5A-5C illustrate different performance characteristic curves according to one example of the present disclosure.

FIG. 5A is a graphical overlay plotting normalized energy per unit wavelength (in nm). FIG. 5A illustrates a curve 550 for an example spectral power distribution, a curve 551 for a normalized photoluminescent response function corresponding to a given EMR-sensitive element, and a curve 552 for a total energy absorbed. As shown in FIG. 5A, an EMR source, such as EMR source 205 or EMR source 105, may emit EMR 110 of varying energy levels and at varying wavelengths. FIG. 5A shows that the sensitivity or performance characteristic of a given EMR-sensitive element, such as EMR-sensitive element 215, is a function of the normalized photoluminescent response function of the EMR-sensitive element 215. Indeed, the greater the overlap of the normalized photoluminescent response function and the spectral power distribution, the greater the total energy absorbed by EMR-sensitive element 215. Essentially, FIG. 5A illustrates that a given EMR source may have a spectral power distribution, as illustrated by curve 550, but that a given EMR-sensitive element may only be sensitive to a relatively small range of wavelengths of the emitted EMR, as seen by the overlapping wavelengths of curves 550 and 551.

In one example, an EMR-sensitive element 215 may have a normalized photoluminescent response function represented by curve 551 as illustrated in FIG. 5A. An EMR source, such as EMR source 205, may be configured to emit EMR 110 within aircraft interior 220. EMR 110 may be emitted according to a predetermined pattern, illumination level, and wavelength (e.g., color) such that the spectral power distribution, as illustrated by curve 550 varies during the course of a flight. For instance, EMR source 205 may be configured to emit EMR 110 of a wavelength of approximately 450 nm during takeoff. EMR source 205 may be configured to emit EMR 110 of a wavelength of approximately 550 nm at a second point during a flight. In the present example, however, it may be determined that the EMR 110 of approximately 550 nm may not be sufficiently absorbed by EMR-sensitive element 215 to meet the minimum threshold requirements for, for instance, luminescence, spectral distribution, and discharge duration, among other things. In another example, it may be determined, based at least in part on the normalized photoluminescent response function of an EMR-sensitive element 215, that EMR 110 of a given wavelength may only be emitted for a maximum aggregate time during a flight.

In one example, a correlation between the normalized photoluminescent response function, as illustrated by curve 551, and the total energy absorbed, as illustrated by curve 552, may be tested in a controlled environment. For instance, a spectral power distribution of a control EMR source 105 may be measured, along with an illumination level of control EMR source 105. A control EMR-sensitive element 115 may be exposed to EMR 110 emitted from control EMR source 105. EMR-sensitive element 115 may be exposed to EMR 110 for a predetermined period of time corresponding to an exposure duration. In one example, it may be possible to correlate a total energy absorbed by the EMR-sensitive element 115 during the exposure duration based, at least in part, on the spectral power distribution and illumination level of the control EMR source 105. In another example, the EMR-sensitive element 115 may be tested at additional spectral power distributions, illumination levels, and exposure durations, and total energy absorbed may be measured, sensed, and/or calculated for each scenario. The correlation between the variables may be used in order to plot the data and provide guidelines and threshold values for operation of EMR-sensitive element 115 and EMR source 105. This data may in turn be used to create operational guidelines for the EMR-sensitive element 115 and EMR source 105. The data may also facilitate the placement of EMR-sensitive element 115, and the frequency, wavelength, and duration of EMR emitted by EMR source 105, among other things.

In another example, a set of guidelines and threshold values may be verified by testing the accuracy of the acquired data. For instance, and referring in part to FIG. 2B, an aircraft interior 220 may comprise EMR source 205 and EMR-sensitive elements 215. The spectral power distribution and illumination level of EMR source 205 may be measured and a total energy absorbed may be calculated per unit time for an EMR-sensitive element 215. In this example, a total energy absorbed by an EMR-sensitive element 215 may also, or in the alternative, be measured and/or sensed in order to evaluate the accuracy of the underlying data. The testing may be repeated for a plurality of spectral power distributions and illumination level of EMR source 205 and/or at a plurality of locations. In one example, the result of this testing may confirm the accuracy of the calculated data, or may indicate a need to review or repeat the laboratory testing of EMR source 205 and EMR-sensitive element 215.

Figure 5B:
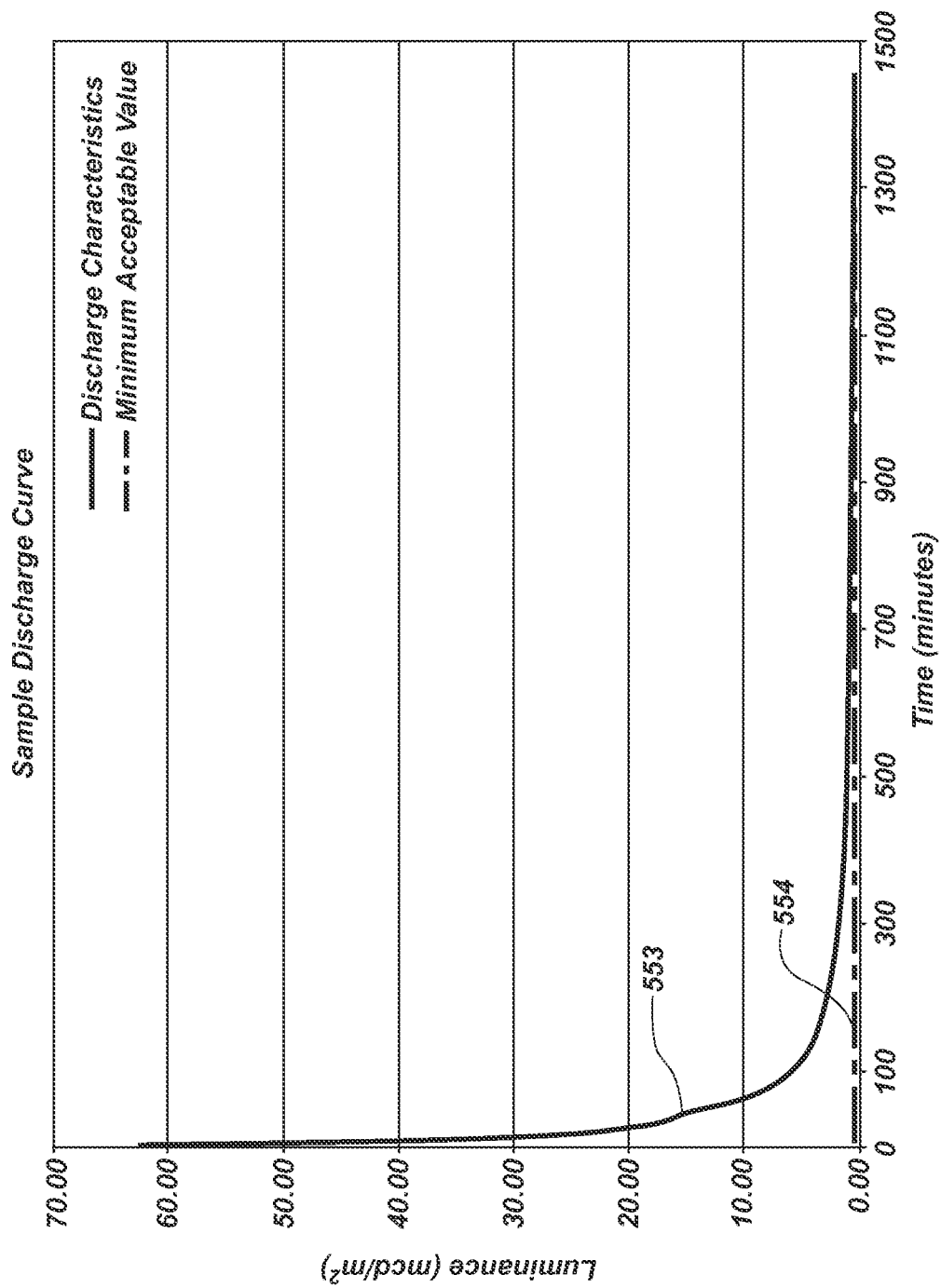
Figure 5C:
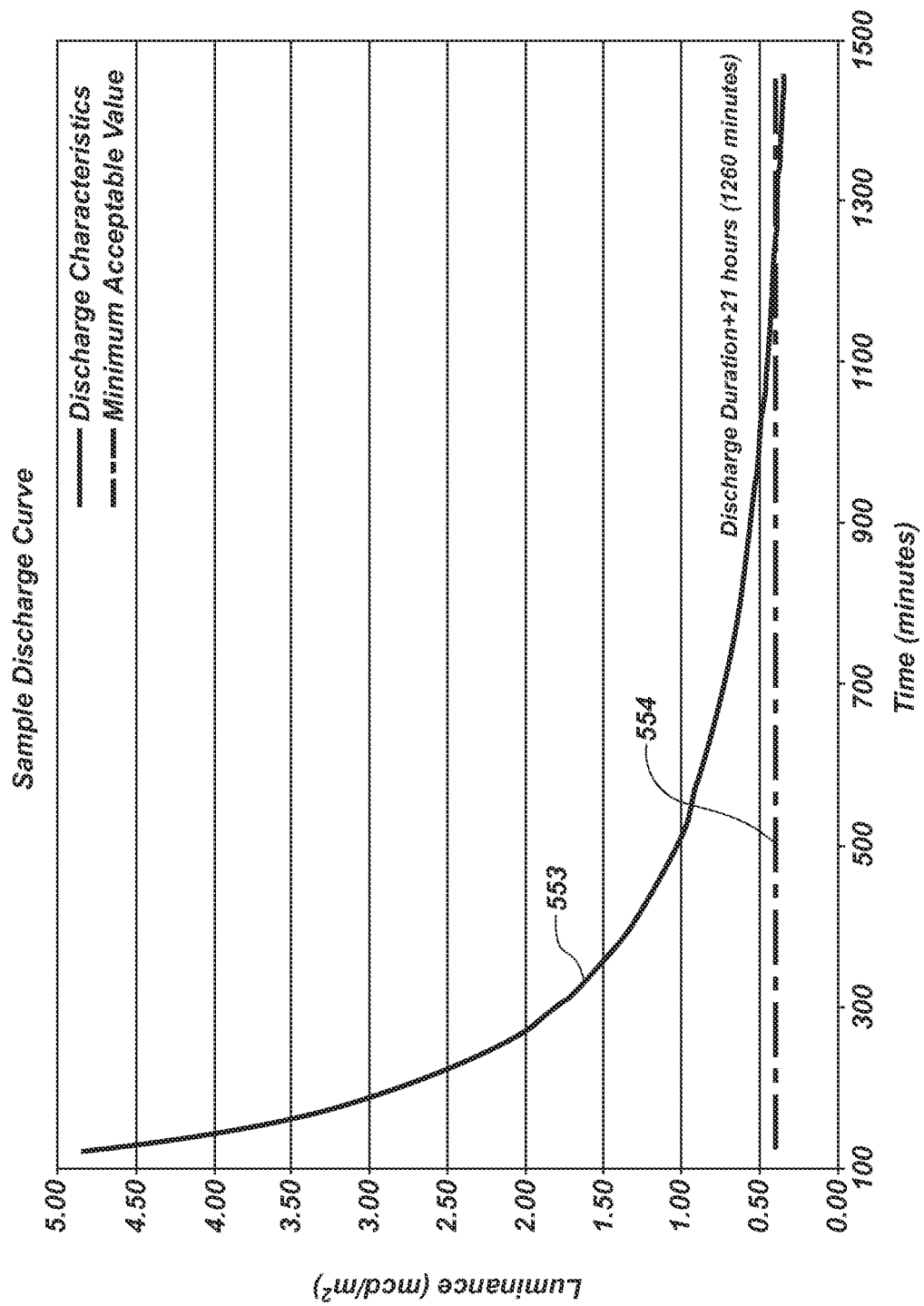

FIGS. 5B and 5C illustrate a discharge duration curve 553 for an EMR-sensitive element, such as EMR-sensitive element 115. FIGS. 5B and 5C show a minimum acceptable illumination level 554 for EMR-sensitive element 115 with a broken line. As illustrated in FIGS. 5B and 5C, a minimum acceptable illumination level 554 may be approximately 0.4 mcd/m$^2$. Of course, any pre-determined minimum acceptable illumination level may be selected based, among other things, on the environment and/or use of the EMR-sensitive element 115. FIGS. 5B and 5C show a discharge duration of approximately 1260 minutes. The discharge duration of EMR-sensitive element 115 may be calculated based, at least in part, on a total energy absorbed by the EMR-sensitive element 115. In one embodiment, the discharge duration may be measured or sensed in order to confirm the accuracy of the discharge duration model for a given EMR-sensitive element 115. The calculated and the measured discharge durations may be analyzed in order to determine whether the calculated discharge duration is consistent with the measured discharge duration. In one example, a calculated discharge duration may be consistent with the measured discharge duration if it is the same as, approximately the same as, or within acceptable thresholds of, the measured discharge duration.

Figure 6:
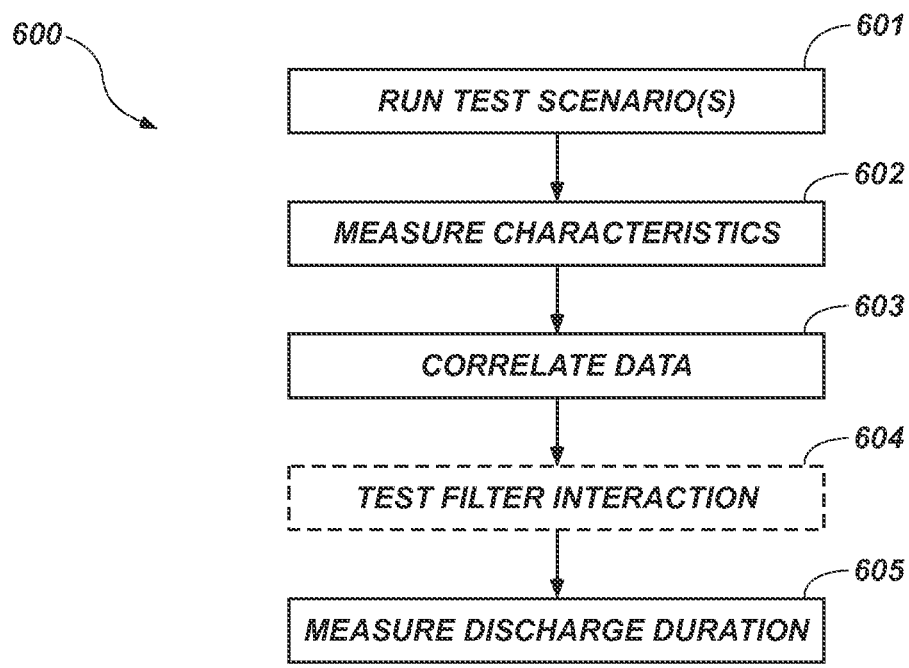
FIG. 6 illustrates a method of measuring a performance characteristic of an element.

FIG. 6 illustrates a method 600 for measuring a discharge duration of an EMR-sensitive element 115. It is to be understood that this figure generally represents the steps in an algorithm to be performed by a calculating device, as discussed above. In a first method step 601, one or more test scenarios are run. In one example, a first scenario may comprise an EMR source 105 having a first spectral power distribution and a first illumination level and a first exposure duration and an EMR-sensitive element 115 having a normalized photoluminescent response function. In this example, a second scenario may comprise a second spectral power distribution and a second illumination level and a second exposure duration. An nth scenario may comprise an nth spectral power distribution and an nth illumination level and an nth exposure duration.

In a next step 602, different characteristics of the EMR source 105 and the EMR-sensitive element 115 may be measured. For instance, the first spectral power distribution and the first illumination level of the EMR source 105 and/or the EMR-sensitive element 115 may be measured or sensed. The second spectral power distribution and the second illumination level of EMR source 105 and/or EMR sensitive element 115 may be measured or sensed. The nth spectral power distribution and the nth illumination level of EMR source 105 and/or EMR sensitive element 115 may also be measured or sensed. The measured characteristics may be correlated to arrive at a total energy absorbed for the plurality of test scenarios in a third method step 603. In one example, the total energy absorbed may be used in conjunction with the normalized photoluminescent response function in order to calculate a discharge duration.

In an optional fourth method step 604, the interaction of a filter with EMR-sensitive element 115 may be tested. For instance, an illumination level and spectral power distribution may be measured for each of the test scenarios based on one or more filters. The resulting values may be correlated to a degradation factor related to the filter, which may affect EMR 110 absorbed and/or emitted from EMR-sensitive element 115. In a fifth method step 605, a discharge duration is measured. In one example, the discharge duration is the total time elapsed for an EMR-sensitive element 115 to reach a minimum threshold illumination level and/or spectral power distribution level. The discharge duration may be correlated to at least one of the spectral power distribution and/or illumination level of an EMR source 105, a normalized photoluminescent response function and/or a total energy absorbed of an EMR-sensitive element 115, and/or a degradation factor of a filter. The correlation of data may be used in order to calculate guidelines and/or operating thresholds for the EMR source 105, EMR-sensitive element 115, and/or filter, among other things.

Figure 7:
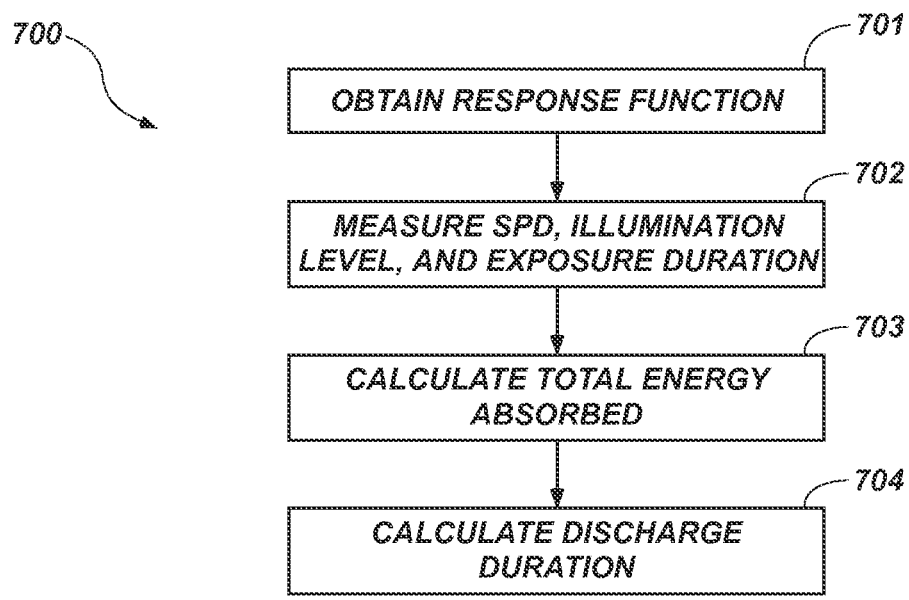
FIG. 7 illustrates a method of calculating a performance characteristic of an element.

FIG. 7 illustrates a method 700 for calculating a discharge duration of an EMR-sensitive element, such as EMR-sensitive element 115 illustrated in FIG. 1. It is to be understood that this figure generally represents the steps in an algorithm to be performed by a calculating device, as discussed above. In a first method step 701, a response function is obtained for EMR-sensitive element 115. In one example, the response function may comprise the normalized photoluminescent response function of EMR-sensitive element 115. For instance, the normalized photoluminescent response function may be provided by a manufacturer of the EMR-sensitive element 115, or may be calculated and/or otherwise sensed.

In a second method step 702, a spectral power distribution, illumination level, and exposure duration of EMR source 105 are measured. In one example, the measurement of characteristics of the EMR source 105 may be performed at a plurality of locations. For instance, EMR source 105 characteristics may be measured at an indicator, such as indicator 230 illustrated in FIG. 2, hanging over a door, and may be measured at a plurality of locations along an EMR-sensitive element 215 running along an aisle 240, among other things. In a third method step 703, a total energy absorbed by EMR-sensitive element 115 is calculated as a function of the measured spectral power distribution, illumination level, and exposure duration as well as the normalized photoluminescent response function of the EMR-sensitive element 115. The calculation of the total energy absorbed may be performed for each of the plurality of locations in order to determine, among other things, whether the EMR-sensitive element 115 and EMR source 105 are operating within the acceptable thresholds at the plurality of locations. In a fourth method step 704, a discharge duration is calculated, related to the total energy absorbed by the EMR-sensitive element 115. In one example, the calculation of the discharge duration may be performed at the plurality of locations in order to determine whether EMR-sensitive element 115 and EMR source 105 are operating within the acceptable thresholds at the plurality of locations.

Figure 8A:
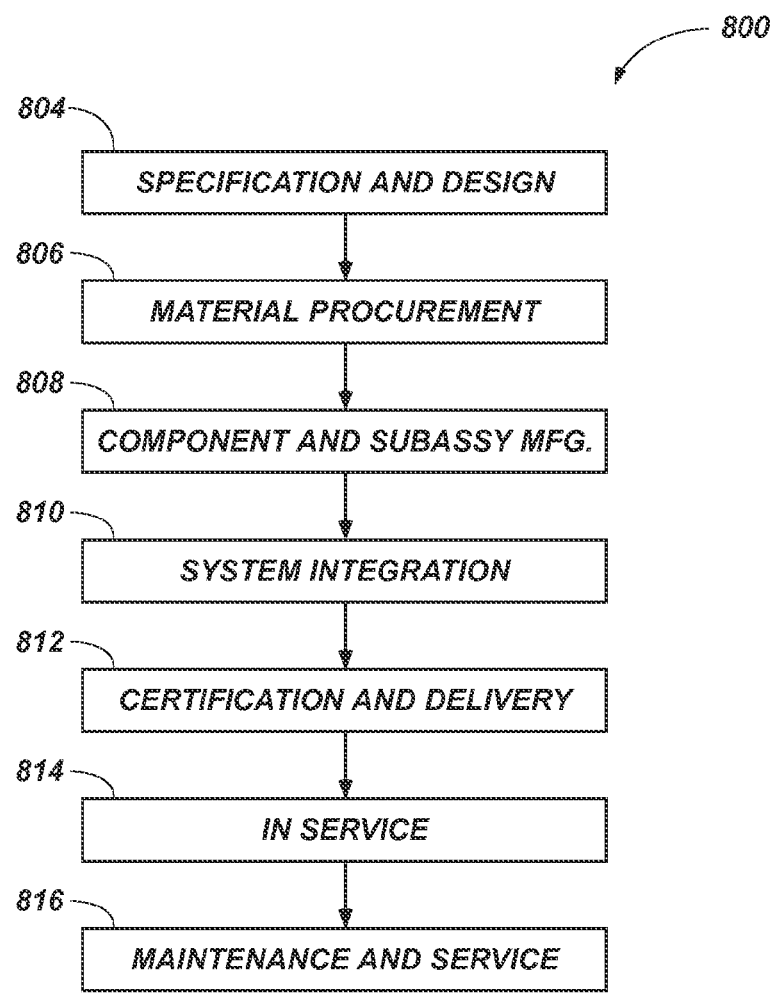
FIGS. 8A and 8B illustrate an example aircraft manufacturing and service method and apparatus.
Figure 8B:
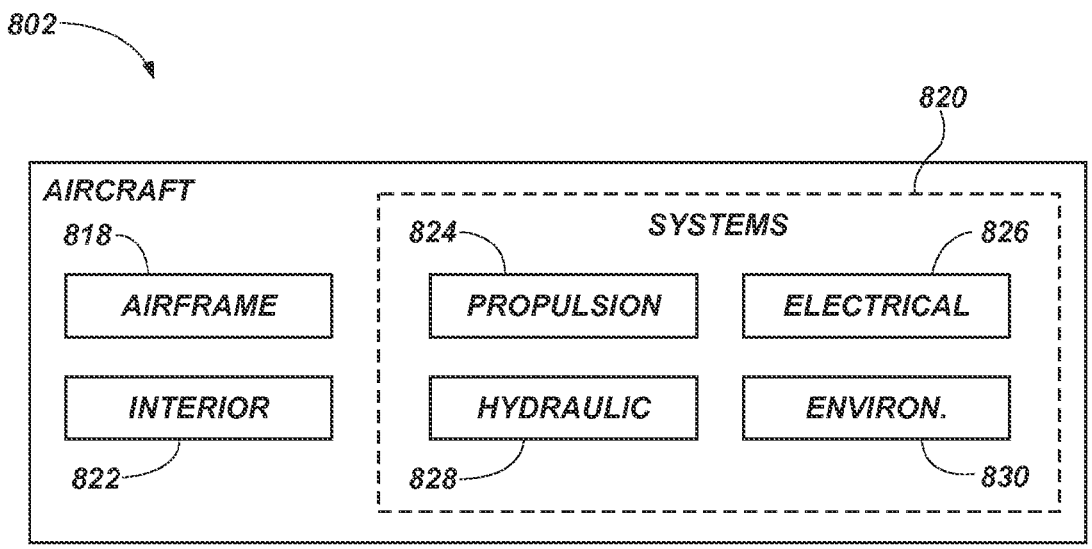

Referring to FIGS. 8A and 8B, examples of the disclosure may be described in the context of an aircraft manufacturing and service method 800 as shown in FIG. 8A and an aircraft 802 as shown in FIG. 8B. During pre-production, exemplary method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service 814 by a customer, the aircraft 802 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may comprise an airline, leasing company, military entity, service organization, and so on.

As shown in FIG. 8B, the aircraft 802 produced by exemplary method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the disclosed examples may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the aircraft 802 is in service 814. Also, one or more apparatus examples, method examples, or a combination thereof may be utilized during the production stages 808 and 810, for example, by substantially expediting assembly of or reducing the cost of an aircraft 802. Similarly, one or more of apparatus examples, method examples, or a combination thereof may be utilized while the aircraft 802 is in service 814, for example and without limitation, to maintenance and service 816.

Although this disclosure has been described in terms of certain preferred examples, other examples that are apparent to those of ordinary skill in the art, including examples that do not provide all of the features and advantages set forth herein, are also within the scope of this disclosure. Accordingly, the scope of the present disclosure is defined only by reference to the appended claims and equivalents thereof.

What is claimed is:

1. A method of selecting a lighting pattern of an aircraft, the aircraft comprising a light source and a photoluminescent element, the method comprising:
    exposing the photoluminescent element to electromagnetic radiation emitted from the light source of the aircraft, wherein the light source has (a) a spectral power distribution and (b) an illumination level;
    sensing the spectral power distribution and the illumination level with a sensor coupled to a first calculating device;
    calculating, by the first calculating device, a total energy absorbed by the photoluminescent element based on (a) the spectral power distribution, (b) the illumination level, and (c) a duration of the exposure of the photoluminescent element to the electromagnetic radiation;
    correlating, by the first calculating device, the total energy absorbed to a discharge duration based on a normalized photoluminescent response function of the photoluminescent element;
    verifying, by the first calculating device, that the (a) spectral power distribution, (b) illumination level, and (c) exposure duration of the light source are in compliance with operational guidelines for the light source and the photoluminescent element based on the discharge duration;
    selecting, by the first calculating device, the lighting pattern based on the (a) spectral power distribution, (b) illumination level, (c) and one of the exposure duration of the light source, or discharge duration of the photoluminescent element; and
    the first calculating device controlling the light source of the aircraft to emit the selected lighting pattern.

2. The method of claim 1, further comprising:
    exposing a control photoluminescent element to electromagnetic radiation emitted from a control light source having (a) a spectral power distribution and (b) an illumination level;
    sensing the spectral power distribution and the illumination level of the control light source with a sensor coupled to a second calculating device;
    correlating, by the second calculating device, each of (a) the spectral power distribution of the control light source, (b) the illumination level of the control light source, and (c) an exposure duration of the control light source, to a control discharge duration, wherein the discharge time is a measure of time elapsed from a termination of the exposure duration to a predetermined illumination level; and
    determining, by the second calculating device, whether the correlated discharge duration is consistent with the control discharge duration.

3. The method of claim 2 wherein the predetermined illumination level is 0.4 mcd/m$^2$.

4. The method of claim 1 further comprising measuring (a) the spectral power distribution and (b) the illumination level at a plurality of locations within the aircraft.

5. The method of claim 1 further comprising the first calculating device creating operational guidelines and minimum operational thresholds for the light source and the photoluminescent element based on the discharge duration.

6. The method of claim 1 further wherein calculating the total energy comprises the first calculating device calculating the total energy absorbed by the photoluminescent element based on a degradation factor related to a filter, the degradation factor programmed into the first calculating device.

7. The method of claim 1 further comprising:
exposing the photoluminescent element to electromagnetic radiation emitted from the light source of the aircraft at (d) a second spectral power distribution and (e) a second illumination level;
sensing the second spectral power distribution and the second illumination level with a sensor coupled to the first calculating device; and
calculating, by the first calculating device, a total energy absorbed by the photoluminescent element based on (d) the second spectral power distribution, (e) the second illumination level, and (f) a second exposure duration; and
verifying, by the first calculating device, that the (d) second spectral power distribution, (e) second illumination level, and (f) second exposure duration of the light source are in compliance with operational guidelines, programmed into the first calculating device, for the light source and the photoluminescent element.

8. A system for determining performance characteristics of a material based on exposure to EMR from an EMR source, the system comprising:
a calculating device;
a sensor, coupled to the calculating device, configured to measure and provide data to the calculating device representing (a) a spectral power distribution, (b) an illumination level, and (c) exposure duration of an EMR source;
a correlation module, associated with the calculating device, configured to correlate (a) the spectral power distribution, (b) the illumination level, and (c) the exposure duration to a total energy absorbed by the material; and
a calculation module, associated with the calculating device, configured to calculate one of (i) a discharge duration related to a normalized response function of the material, or (ii) an energy generation value related to a response function of the material, or (iii) a total effective energy value related to a response function of the material.

9. The system of claim 8 further comprising:
a control sensor, coupled to the calculating device, configured to measure (d) a control spectral power distribution, (e) a control illumination level, and (f) a control exposure duration of the EMR source;
a control correlation module, associated with the calculating device, configured to correlate (d) the control spectral power distribution, (e) the control illumination level, and (f) the control exposure duration of the EMR source to a total energy absorbed by the material; and
a control measurement module, associated with the calculating device, configured to measure one of (iv) a control discharge duration, or (v) a control energy generation of the material, or (vi) a total effective energy value.

10. The system of claim 8 wherein:
the sensor is configured to measure (a) a spectral power distribution at a second location, (b) an illumination level at the second location, and (c) an exposure duration at the second location;
the correlation module is configured to correlate (a) the spectral power distribution at the second location, (b) the illumination level at the second location, and (c) the exposure duration at the second location to a total energy absorbed by the material; and
the calculation module is configured to calculate one of (i) a discharge duration at the second location, (ii) an energy generation value at the second location, or (iii) a total effective energy value at the second location.

11. The system of claim 8 further wherein the discharge duration or the energy generation value is used to create operational guidelines and minimum operational thresholds.

12. The system of claim 8 wherein the material comprises a filter having a degradation factor, programmed into the calculating device, and the calculation of the discharge duration or the energy duration by the calculating device is related to the degradation factor.

13. The system of claim 8 further wherein:
the correlation module is configured to correlate a second total energy absorbed by the material based on (a) a second spectral power distribution, (b) a second illumination level, and (c) a second exposure duration of a second EMR source;
the correlation module is configured to correlate a third total energy absorbed by the material based on (a) a third spectral power distribution, (b) a third illumination level, and (c) a third exposure duration of a third EMR source; and
the calculation module is configured to calculate one of (i) a discharge duration for each of the second and third total energy absorbed, or (ii) an energy generation value for each of the second and third total energy absorbed, or (iii) a total effective energy value for each of the second and third total energy absorbed.

14. The system of claim 8 wherein the EMR source comprises an LED source, the material is a photoluminescent material, and the EMR source and the material are located in an aircraft interior.

* * * * *